United States Patent
Bauer, Sr.

(10) Patent No.: US 8,348,561 B1
(45) Date of Patent: Jan. 8, 2013

(54) MOTORCYCLE RESTRAINING DEVICE

(76) Inventor: Joey Bauer, Sr., Honey Creek, IA (US)

( * ) Notice: Subject to any disclaimer, the term of this patent is extended or adjusted under 35 U.S.C. 154(b) by 0 days.

(21) Appl. No.: 13/198,109

(22) Filed: Aug. 4, 2011

(51) Int. Cl.
*B60P 3/06* (2006.01)

(52) U.S. Cl. .......................................................... 410/3

(58) Field of Classification Search .................. 410/3, 7, 410/22, 101; 211/17, 22
See application file for complete search history.

(56) References Cited

U.S. PATENT DOCUMENTS

| | | | | |
|---|---|---|---|---|
| 1,605,579 | A * | 11/1926 | Conn et al. | 410/13 |
| 1,794,321 | A * | 2/1931 | Rebuck | 410/22 |
| 6,109,494 | A * | 8/2000 | Pilmore | 224/547 |
| 6,488,157 | B2 * | 12/2002 | Chen | 211/20 |
| 7,198,443 | B2 | 4/2007 | Macomber, III | |
| 7,287,942 | B1 | 10/2007 | Valkenburgh | |
| 7,402,012 | B2 | 7/2008 | Bennett | |
| 7,648,317 | B2 | 1/2010 | Kobacker, II et al. | |
| 7,785,050 | B2 * | 8/2010 | Fonseca, Jr. | 410/7 |
| 7,896,592 | B1 * | 3/2011 | Winchel et al. | 410/3 |
| 2003/0141493 | A1 * | 7/2003 | Siivonen | 254/131 |
| 2006/0159541 | A1 * | 7/2006 | Fullenkamp | 410/3 |
| 2006/0163543 | A1 | 7/2006 | Kobacker, II et al. | |
| 2006/0257223 | A1 * | 11/2006 | Saldana | 410/3 |
| 2008/0124183 | A1 * | 5/2008 | Murphy | 410/7 |

OTHER PUBLICATIONS www.Boltiton.com, "Bolt It on", 2 pages, [retrieved from the Internet on Oct. 26, 2011].
www.ststands.com, "StraplessTransportStands—The Original-", 2 pages, [retrieved from the Internet on Oct. 26, 2011].

* cited by examiner

*Primary Examiner* — H Gutman
(74) *Attorney, Agent, or Firm* — McKee, Voorhees & Sease, P.L.C.

(57) ABSTRACT

A motorcycle restraining device for securing a motorcycle to a trailer or other transport device is provided. The restraining device includes first and second brackets permanently attached to opposite sides of a motorcycle. A connecting rod is inserted through the brackets when the motorcycle is to be loaded onto the transport device. The motorcycle with the rod then approaches first and second receiving members, which constitutes an anchor, and the rod is secured to the receiving members. As the receiving members are adjustable and the design of the brackets adjustable as well, the motorcycle restraining device of the present invention may be used with generally any make and model of motorcycle. In addition, the brackets are permanently attached such that they do not create any problems or prevent ride ability of the motorcycle.

19 Claims, 9 Drawing Sheets

MOTORCYCLE RESTRAINING DEVICE

FIELD OF THE INVENTION

The present invention relates generally to a device for restraining a motorcycle during transport or storage. More specifically, but not exclusively, the invention relates to a device for restraining a motorcycle during transport in a vehicle or trailer without the use of straps, tie downs, or other methods of adding stress to the motorcycle suspension.

BACKGROUND OF THE INVENTION

While many people own motorcycles (also known as "bikes"), both for street riding and off-road riding, there are times when they may not be ridden, and instead need to be hauled or transported. However, the hauling of motorcycles creates problems due to the fact that they only have two wheels, and are generally top heavy due to the motor being raised at a location between the two wheels. A kickstand may be used for temporarily resting a motorcycle, but it would not be able to keep a motorcycle from tipping over while travelling in or on a trailer or other vehicle.

Straps or tie downs have historically been used in transporting motorcycles in trailers or connected to vehicles. One or more straps must be attached to each side of the motorcycle and then to the trailer. The straps then must be tightened to ensure that the motorcycle will not tip one way or another. Tightening the straps causes a high amount of pressure to act downwardly on the motorcycle, which can cause wear and tear on the shocks and/or suspension of the motorcycle. In addition, it is time consuming to add and remove the straps, and the restraining of the motorcycle with straps or tie downs cannot usually be accomplished by one person. At least one person must hold the motorcycle, while another either straps the bike down, or removes the straps.

Other ways of restraining a motorcycle in a trailer or vehicle are known that do not incorporate the use of straps or tie downs. In such systems, brackets or clamps are added to the motorcycle, generally at the rear wheel, after riding and before loading the bike in the trailer or vehicle. Therefore, the brackets and/or clamps are not permanent fixtures on the motorcycles. The extra components take time to add, and much like with the use of straps, cannot be accomplished by a lone person. Again, at least one person must hold the motorcycle steady while another person or people attach the clamps or brackets to the specific locations of the motorcycle. Only then may the motorcycle be loaded onto or into the trailer and secured for transporting. However, once the motorcycle/trailer combination has reached its destination and the motorcycle has been removed from the trailer, the clamps and/or brackets must be removed before the motorcycle is safe to ride. As with the preloading process, the unloading process will take multiple people to accomplish and will cut into or reduce the amount of time the owner may ride his or her motorcycle.

Therefore, there is a need in the art for a motorcycle restraining device that can be incorporated with a trailer or vehicle that does not include the use of straps or tie downs that put undue stress on the suspension and/or shocks of the motorcycle. There is also a need in the art for a restraining and hauling device that allows a motorcycle rider to load and unload his or her motorcycle onto a trailer or other vehicle that is not time consuming and that can be done without the aid of other people.

It is therefore a primary object, feature, and/or advantage of the present invention to overcome or improve on deficiencies in the art.

It is another object, feature, and/or advantage of the present invention to provide a motorcycle transport retaining device that prevents a motorcycle from falling over or otherwise causing damage during transport in a trailer or vehicle.

It is yet another object, feature, and/or advantage of the present invention to provide a motorcycle transport retaining device that does not put undue stress on the motorcycle.

It is still another object, feature, and/or advantage of the present invention to provide a motorcycle transport retaining device that is permanently attached to a portion of the motorcycle.

It is another object, feature, and/or advantage of the present invention to provide a motorcycle transport retaining device that allows a rider to quickly restrain his or her motorcycle to a trailer without the help of another person.

It is another object, feature, and/or advantage of the present invention to provide a motorcycle restraining device that can be used with all different brands and styles of motorcycles.

It is still another object, feature, and/or advantage of the present invention to provide a motorcycle restraining device that can be easily moved to another trailer.

SUMMARY OF THE INVENTION

According to one aspect of the present invention, a motorcycle restraining device for securing a motorcycle to a trailer is provided. The restraining device includes a first and second bike bracket attached to opposite side of the motorcycle, with the brackets extending generally downwardly from the motorcycle. A connecting rod is inserted through the first and second bike brackets. An anchor is attached to the trailer. The anchor includes first and second receiving members for receiving and securing the connecting rod.

According to another aspect of the present invention, a motorcycle restraining device for securing a motorcycle to a trailer for hauling or storing the motorcycle is provided. The restraining device includes a first and second bike bracket attached to opposite sides of the motorcycle, with the first and second bike brackets extending generally downwardly from the motorcycle. A connecting rod is inserted through the first and second bike brackets and extending beyond the first and second bike brackets. A first receiving member is provided for receiving a portion of the connecting rod extending away from the first bike bracket, and the first receiving member comprises at least one base bracket, a tower slide adjustably connected to the at least one base bracket, and a swing latch rotatably connected to the tower slide adapted to surround the connecting rod. A second receiving member for receiving a portion of the connecting rod extending away from the second bike bracket is also provided, the second receiving member comprising at least one base bracket, a tower slide adjustably connected to the at least one base bracket, and a swing latch rotatably connected to the tower slide adapted to surround the connecting rod.

According to yet another aspect of the present invention, a motorcycle restraining device for securing a motorcycle to a trailer for hauling or storing the motorcycle is provided. The device includes a first bike bracket connected to the preexisting bolt sites of the right side of a motorcycle, the first bike bracket extending forwardly and downwardly. The device also includes a second bike bracket connected to the preexisting bolt sites of the left side of the motorcycle, the second bike bracket extending forwardly and downwardly. The device further includes a connecting rod extending through and beyond the first and second bike brackets, the connecting rod including protrusions for securing the rod in place relative to the bike brackets. A first receiving member for receiving a portion of the connecting rod extending away from the first bike bracket is also provided, the first receiving member comprising at least one base bracket, a tower slide adjustably connected to the at least one base bracket, and a swing latch rotatably connected to the tower slide adapted to surround the connecting rod. Finally, a second receiving member for receiving a portion of the connecting rod extending away from the second bike bracket is provided, the second receiving member comprising at least one base bracket, a tower slide adjustably connected to the at least one base bracket, and a swing latch rotatably connected to the tower slide adapted to surround the connecting rod.

DETAILED DESCRIPTION OF THE PREFERRED EMBODIMENTS

The following figures show and describe an embodiment of the motorcycle restraining device 10 of the present invention. The figures show one particular motorcycle 12 and trailer 22. However, it should be appreciated that the restraining device 10 of the present invention can be used with generally any make and model of motorcycle, as well as any type of trailer, pickup, or any other device or vehicle for transporting the motorcycle.

Figure 1:
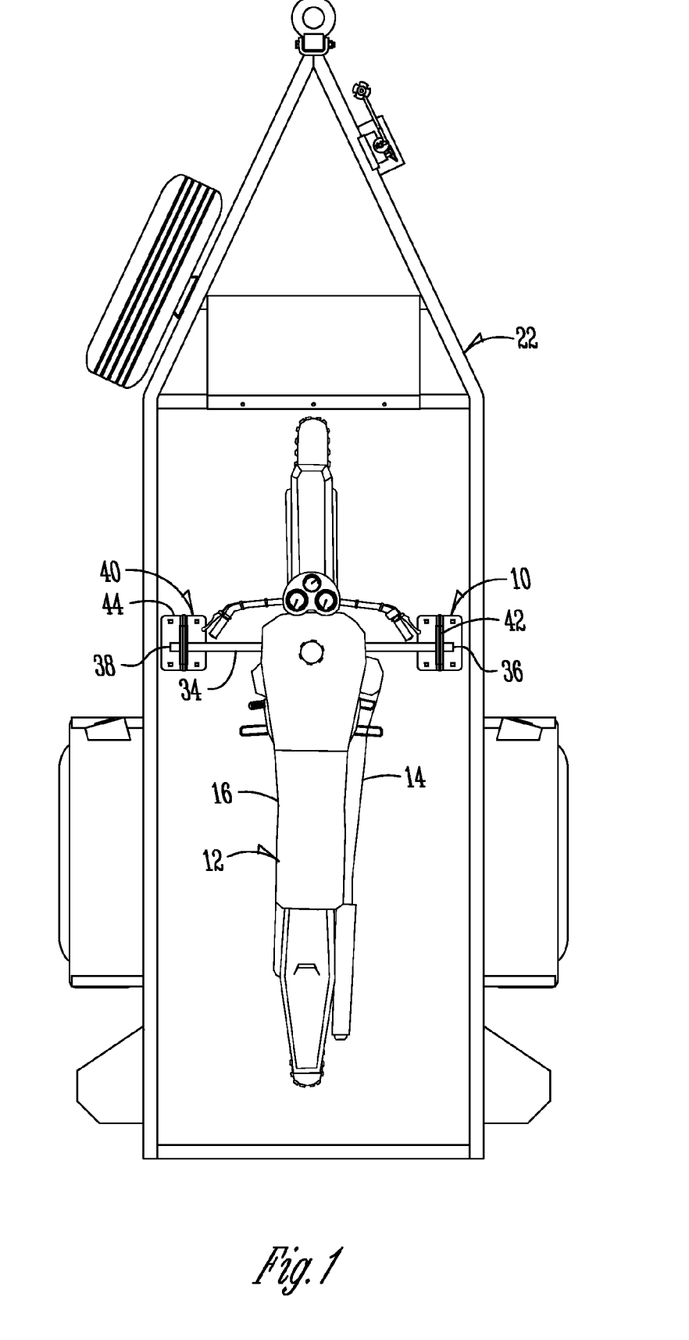
FIG. 1 is plan view of a motorcycle restrained to a trailer by the motorcycle restraining device of the present invention.

FIG. 1 is a generally top plan view of a motorcycle 12 restrained to a trailer 22 by the motorcycle restraining device 10 of the present invention. As shown, the motorcycle 12 is positioned on the trailer 22 restrained without the use of any straps, tie downs, or other method that uses a generally downward force to restrain the motorcycle 12 during transport. Generally, the motorcycle 12 includes a right side 14 and an opposite left side 16. The right and left sides of the motorcycle 12 include foot pegs 18, which are generally bolted to the sides of the motorcycle 12 at bolt sites 20. The bolt sites 20 and foot pegs 18 will be shown for one example in the figures following. The right and left sides 14, 16 are used only for description of the figures, and it should be appreciated that the restraining device be used regardless of the orientation of the sides.

The motorcycle restraining device 10 includes first and second brackets 24, 26, which are attached to the right and left sides 14, 16 of the motorcycle 12. The brackets are shaped and sized such that they may be permanently attached to the motorcycle 12. A connecting rod 34 is inserted through the first and second brackets 24, 26 before the motorcycle 12 is loaded onto the trailer 22. The connecting rod 34 includes extension ends 36, 38, which extend beyond the width of the motorcycle 12. The motorcycle 12 is then driven or pushed onto the trailer 22 and into engagement with the anchor 40, which includes a first receiving member 42 for receiving the first rod extension 36, and a second receiving member 44 for receiving the second rod extension 38. The first and second receiving members 42 of the anchor 40 are secured to the trailer 22. The first and second receiving members 42, 44 are then closed and locked or otherwise secured to restrain the motorcycle 12 in placed on a trailer 22 for transport of the motorcycle 12.

Figure 2A:
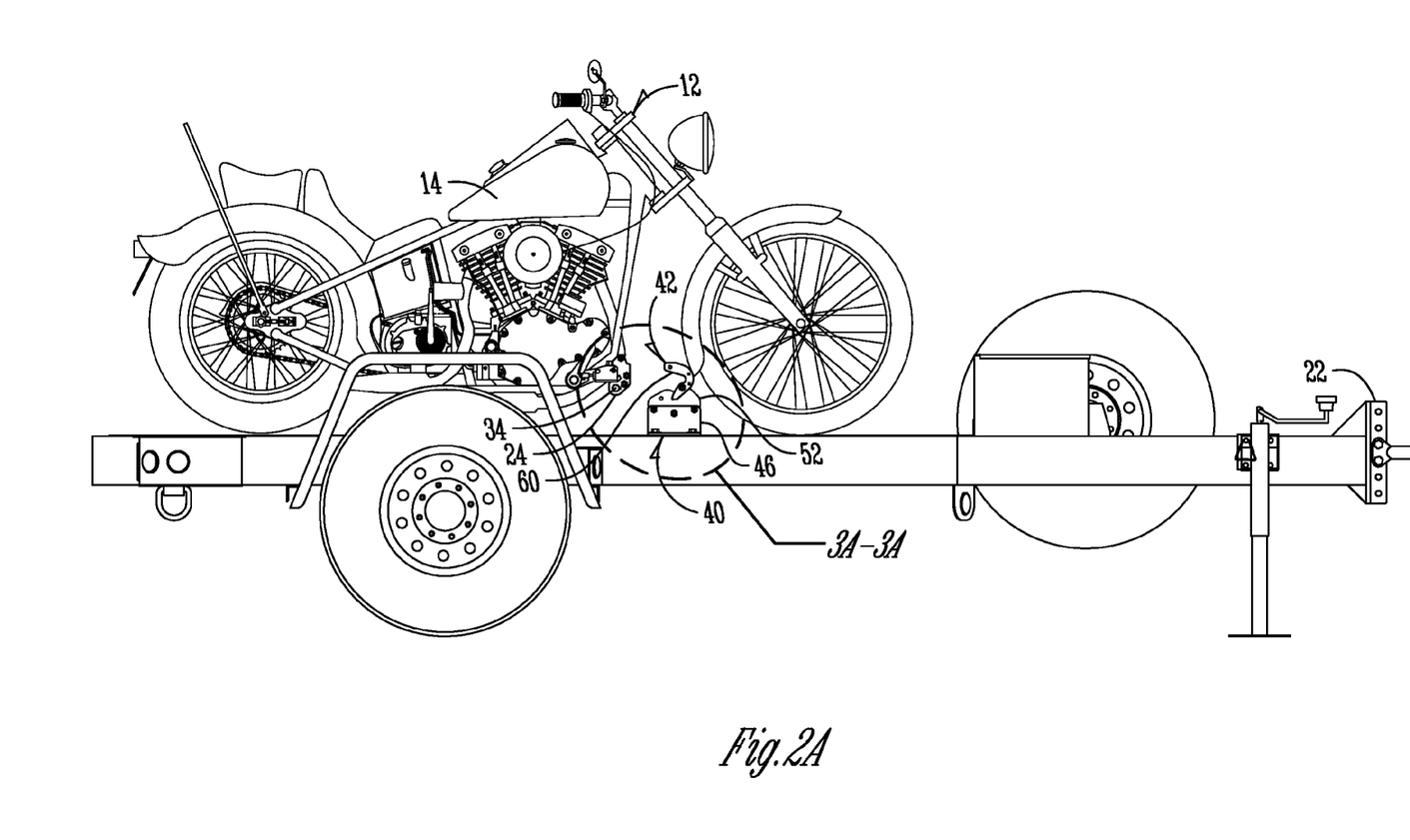
FIGS. 2A and 2B are side views of the motorcycle prior to and after connecting the motorcycle to the motorcycle restraining device.
Figure 2B:
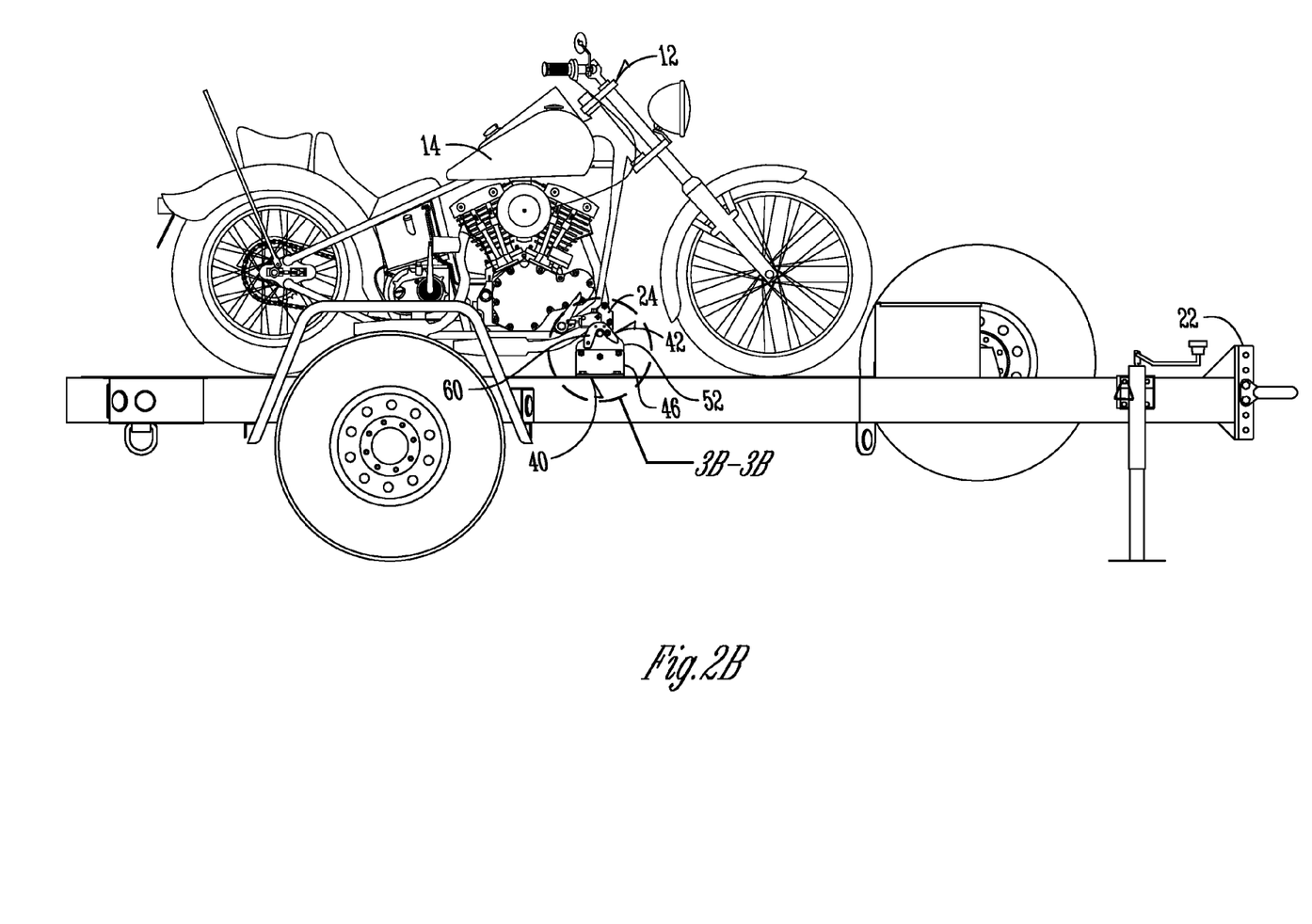
Figure 3A:
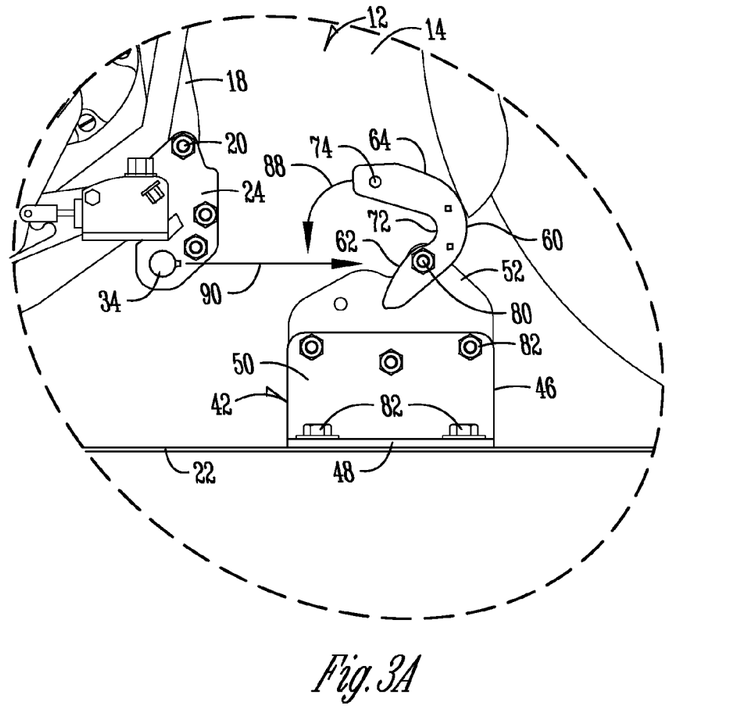
FIG. 3A is an enlarged view of a portion of FIG. 2A showing the connecting rod approaching the anchor of the restraining device.
Figure 3B:
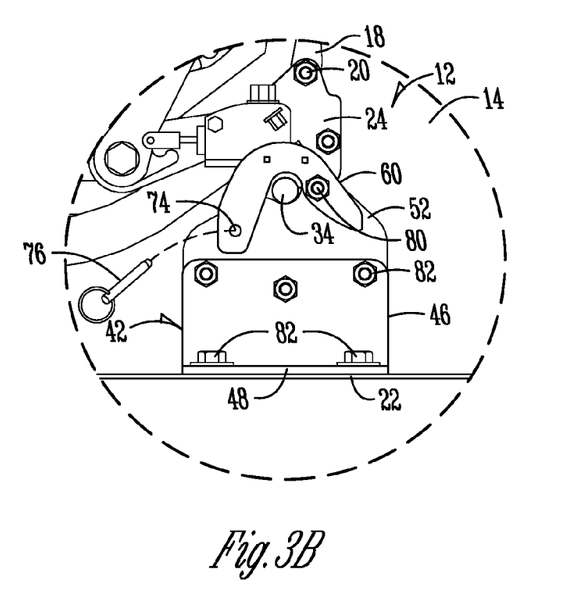
FIG. 3B is an enlarged view of a portion of FIG. 2B showing the connecting rod contained within the swing latch of the anchor.

FIGS. 2A and 2B are side views of the motorcycle 12 showing the motorcycle 12 before and after engagement of the connecting rod 34 to the anchor 40 of the motorcycle restraining device 10. FIG. 2A and enlarged FIG. 3A show that the first bike bracket 24 has been attached to the right side 14 of the motorcycle 12 at the foot peg bolt sites 20 of the motorcycle 12. As the motorcycle 12 includes an existing site where the foot peg 18 is attached to the motorcycle 12, the design of the bracket 24 may be adjusted according to the make and model of the motorcycle to fit with the existing bolt site. Therefore, the first and second bike brackets 24, 26 may be permanently affixed to the motorcycle 12 without causing any clearance issues or any problems with normal use, i.e., riding, of the motorcycle 12. It should be noted that the exact size and shape of the first and second bike brackets 24, 26 will be determined by the make and model of the motorcycle 12 such that the brackets may be attached to the motorcycle 12 at the optimal location to use the motorcycle restraining device 10 without causing any clearance or other issues with the normal use of the motorcycle 12. Therefore, the present invention contemplates any and all shapes of the bike brackets 24, 26 and is not to be limited to the exact depiction shown throughout the figures. The present invention also contemplates that the bike brackets 24, 26 may be attached to other parts of the motorcycle 12 to allow permanent fixture of the brackets on different makes and models.

Referring back to FIGS. 2A and 3A, what is shown is the motorcycle 12 with the first bike bracket 24 attached thereto and a connecting rod 34 inserted therein approaching the first receiving member 42 of the motorcycle restraining device 10. The first receiving member 42 includes a base bracket 46, a tower slide 52 attached to the base bracket 46, and a swing latch 60 pivotally attached to a portion of the tower slide 52. The tower slide 52 is adjustably attached to the base bracket 46 such that the height of the tower slide 52 may be adjusted. The adjustability of the height of the tower slide 52 allows the receiving member 42 to be used with generally any make and model of the motorcycle 12. Once the correct height has been chosen, the tower slide 52 may be affixed in place by the use of a securing member 82, such as bolts, pins, screws, or any other securing means. The motorcycle 12 approaches in the direction shown by the arrow 90 in FIG. 3A. The connecting rod 34 is at a height such that moving the connecting rod into engagement with the receiving member 42 causes the cam portion 62 of the swing latch 60 to pivot at rotation point 70 causing the arcuate portion 64 of the swing latch 60 to close and surround the connecting rod 34. The swing latch 60 rotates in the direction generally shown by arrow 88 in FIG. 3A to a position shown in FIGS. 2B and 3B. At this position, the connecting rod 34 is positioned in a recess 58 of the tower slide 52 and a recess 72 of the swing latch 60. The swing latch 60 is then locked in place at the locking hole 74 by a locking member 76, as will be described in greater detail below. While FIGS. 2A through 3B show the right side 14 of the motorcycle 12 and the first receiving member 42 of the restraining device 10, it should be appreciated that the second receiving member 44 is generally identical to the first receiving member 42 and the same process will occur with the second rod extension 38 approaching the second receiving member 44 on the left side 16 of the motorcycle 12.

Figure 4:
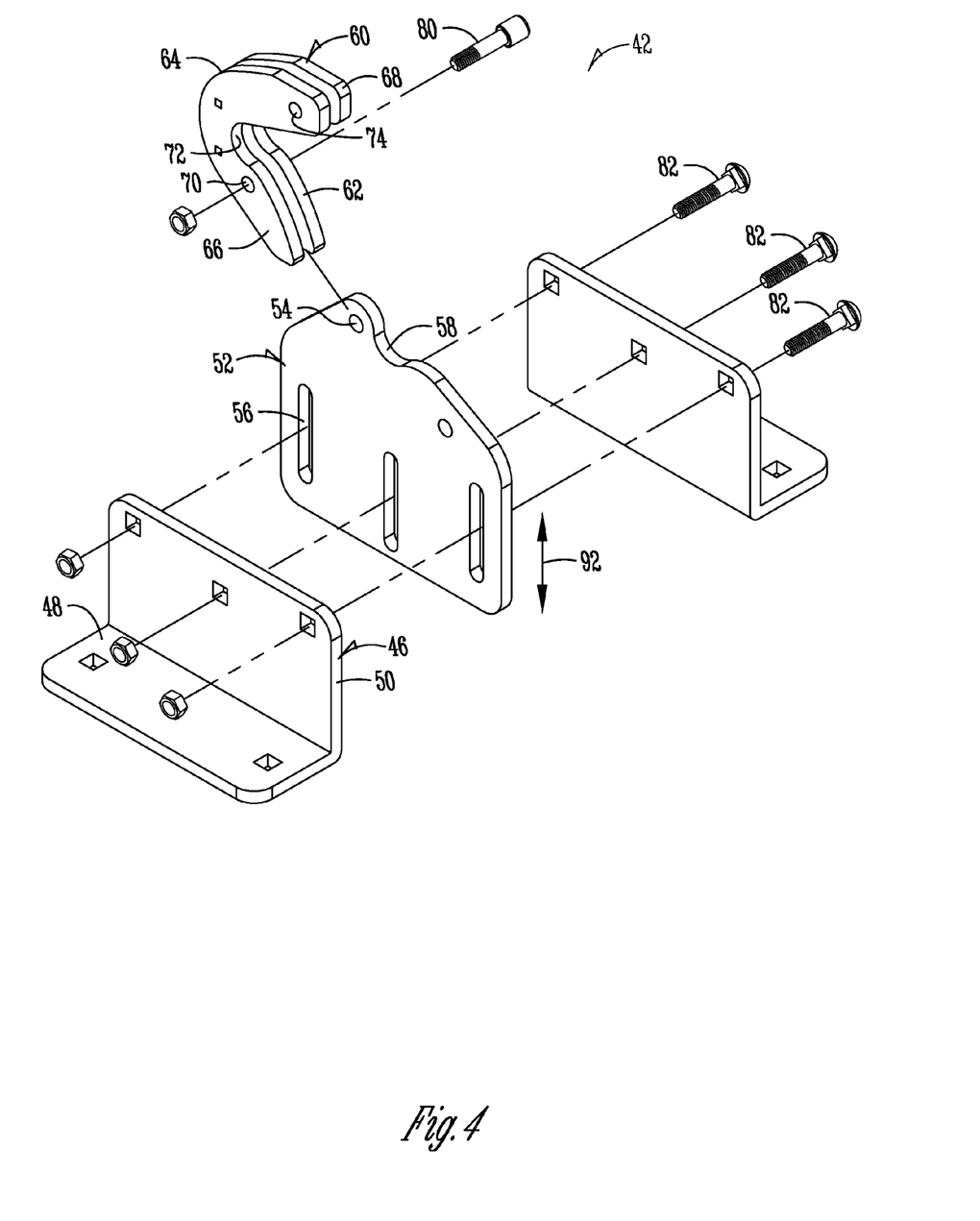
FIG. 4 is an exploded view of one receiving member of the restraining device.

FIG. 4 is an exploded view of the first receiving member 42 of the restraining device 10 of the present invention. As stated above, the second receiving member 44 will be an identical assembly to the first receiving member 42, and thus only one receiving member is needed to be shown. The receiving member 42 includes two base brackets 46 oriented oppositely to one another. The base brackets 46 include a bracket base 48 and a bracket extension 50 extending generally upwardly from the bracket base 48. The bracket base includes apertures that allow the base brackets to be attached to a trailer 22 or other transporting means. In addition, the base brackets 46 are generally made of a rigid material, such as steel or sheet metal, and may be constructed of a flat piece of steel that can bent into the shape shown in FIG. 4.

Positioned between the two base brackets is a tower slide 52. The tower slide 52 includes holes 54 and slots 56. The slots 56 correspond with connecting holes of the base brackets 46 to allow the tower slide 52 to be height adjustable to accommodate a generally universal range of motorcycle make and models. Therefore, as shown in FIG. 4, the tower slide 52 may be adjustable in the direction of the arrow 92 and held in place by securing members 82. The securing members 82 shown in FIG. 4 are bolt and corresponding nuts. However, it should be appreciate that any other securing means may be used with the invention, such as pins, adhesives, or any other adjustable securing means. The tower slide 52 further includes a recess portion 58 for receiving a portion of the connecting rod 34. As the recess 58 is set into the top portion of the tower slide 52, it will help retain the connecting rod 34 in place during transfer. The tower slide 52 is made of a rigid material, such as steel, sheet metal, or the like, and the holes and slots may be drilled, laser cut, stamped, or molded into place along with the overall shape of the tower slide 52.

A swing latch 60 is pivotally attached to the tower slide 52 near the tower slide recess 58. The swing latch 60 may be formed of one member or may include first and second swing latch members 66, 68. If two members are used to form the swing latch 60, a brace, such as an I-brace or nut and bolt, is inserted through the rotation point 70 and tower slide hole 54 to hold the two members together while also allowing the swing latch 60 to rotate. The swing latch 60 includes a humped or cam portion 62 and an arcuate portion 64, with a recess 72 therebetween. The cam portion 62 allows the swing latch 60 to close generally automatically when the connecting rod comes into contact with the portion of the swing latch 60. The arcuate portion 64 of the swing latch 60 surrounds the connecting rod 34 when the swing latch 60 is closed. The recess portion 72 of the swing latch 60 corresponds with recess 58 of the tower slide 52 to form a cavity in which the connecting rod is held during transfer. The swing latch 60 also includes a locking hole 74, which is an aperture through both members 66, 68 of the swing latch 60. The locking hole 74 corresponds with a hole of the tower slide 52. When the swing latch 60 is closed about the connecting rod 34, a locking member, such as a pin, is placed through the locking hole 74 and corresponding hole of the tower slide 52 to secure the swing latch 60 closed about the connecting rod 34. This ensures that the swing latch 60 will not open during transport of the motorcycle 12.

Figure 5A:
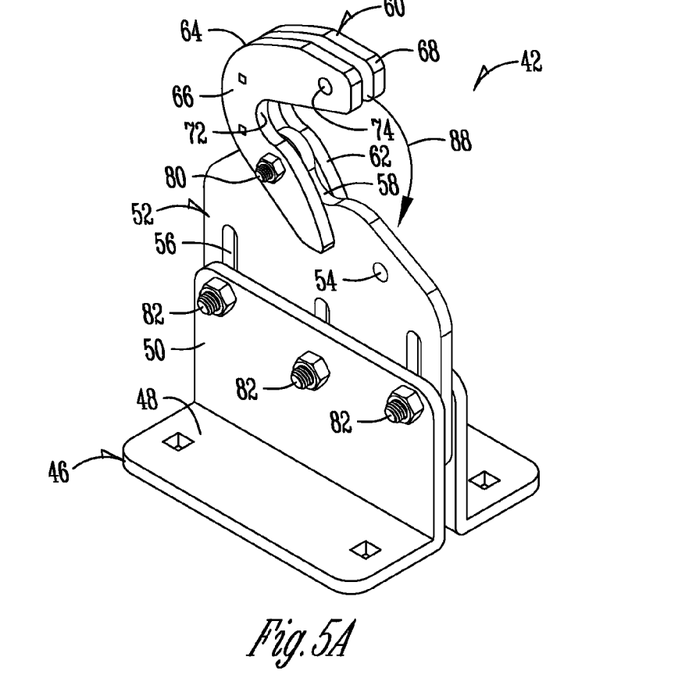
FIGS. 5A and 5B are open and closed views of one restraining device showing the swing latch open and closed.
Figure 5B:
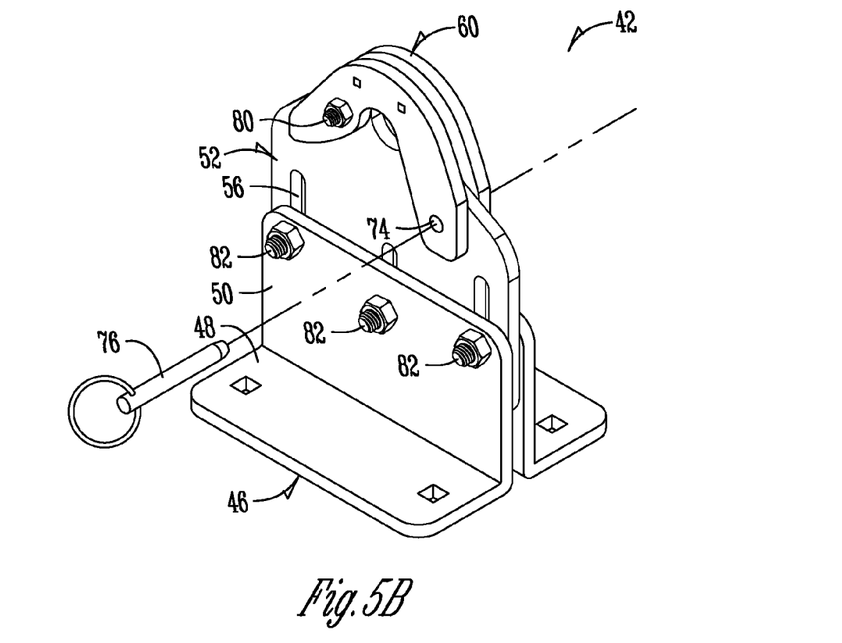

FIGS. 5A and 5B show the first receiving member 42 in an open and closed position. The Figures show the components of FIG. 4 assembled into a working receiving member. FIG. 5A shows the tower slide 52 positioned between the two base brackets 46 and held in place at the desired height by the connecting members 82. As discussed above, the first and second members 66, 68 of the swing latch 60 are held together by the brace 80, which may be an I-brace, which allows the swing latch 60 to rotate in the direction generally shown by the arrow 88. FIG. 5B shows the swing latch 60 in a closed position. The swing latch 60 would close after the connecting rod 34 has come in contact with the cam portion 62 of the swing latch 60, which causes the arcuate portion 68 to rotate about the rotation point 70 to align the locking bolt 74 with the hole of the tower slide 52. A locking member 76 is inserted through the swing latch 60 and tower slide 52 to hold the swing latch 60 closed in connection to the tower slide 52. FIG. 5 shows the locking member 76 to be a pin. However, the locking members 76, 78 may be any type of quick release pin, such as T-handle pins, ring handle pins, double acting pins, round pins, or any other locking pins known in the art. While the exact type of pin or locking member 76 is not designated by the present invention, it should be appreciated that any method of holding the swing latch 60 in place with the tower slide 52 may be used.

Figure 6A:
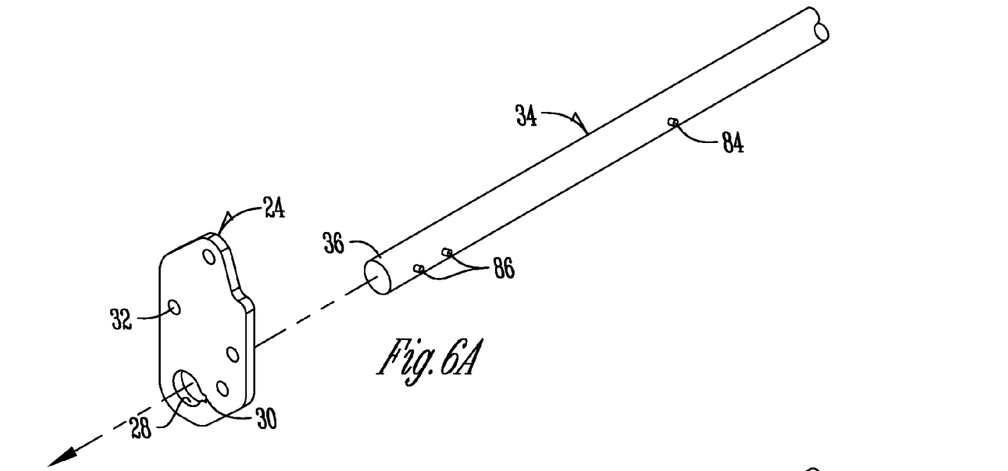
FIGS. 6A-6C are systematic views of the connecting rod being constrained by protrusions in the rod to the bike bracket.
Figure 6B:
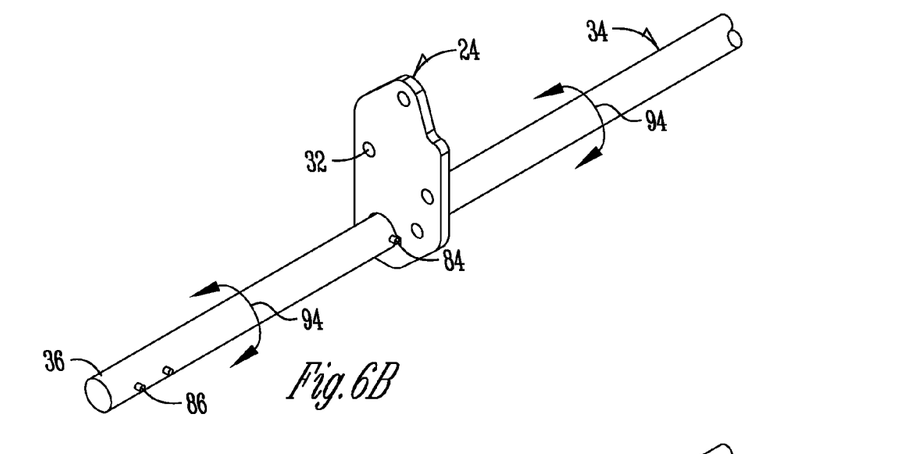
Figure 6C:
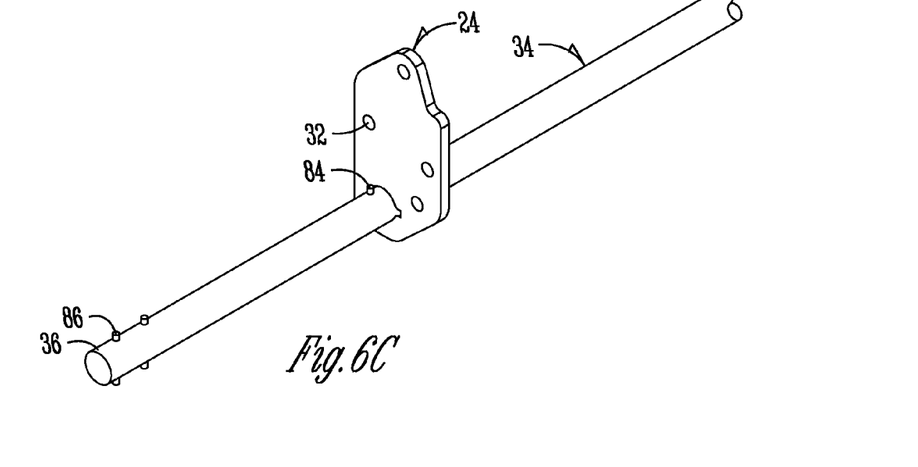

FIGS. 6A-6C show a method and design of inserting and securing the connecting rod 34 to the first and second bike brackets 24, 26 to prevent the connecting rod 34 from sliding or becoming uninserted through the brackets during transport. As shown, the bracket 24 includes a plurality of holes 32 for attaching the bracket to the motorcycle 12. The bracket also includes an aperture 28 with a notch 30. The connecting rod 34 includes swing latch protrusions 86 and bracket protrusions 84. The rod is a steel, hollow shaft, with the protrusions, or nipples, extending therefrom. The swing latch protrusions 86 are aligned with one another and are spaced to engage and surround the swing latch 60 in closed position to keep the connecting rod 34 from sliding through the closed swing latch 60 during transport. The bracket protrusions 84 are positioned on opposite sides of the connecting rod 34 with one protrusion being in line with the swing latch protrusions 86. The rod is inserted through the aperture 28 of the bracket 24 with the protrusions in line with the notch 30 of the bracket 24. Once the first bracket protrusion 84 has passed through the notch 30, the rod is rotated as shown by the arrow 94 in FIG. 6B to offset the bracket protrusion 84 from the notch 30. Therefore, the two bracket protrusions 84 are on opposite sides of the bracket 24, with neither of the protrusions being in line with the notch 30 of the bracket. The two protrusions will work to keep the connecting rod 34 in place in relation to the bracket 24 without allowing the connecting rod 34 to slide in one direction or another through the aperture 28 of the bracket 24. The result is shown in FIG. 6C.

Figure 7A:
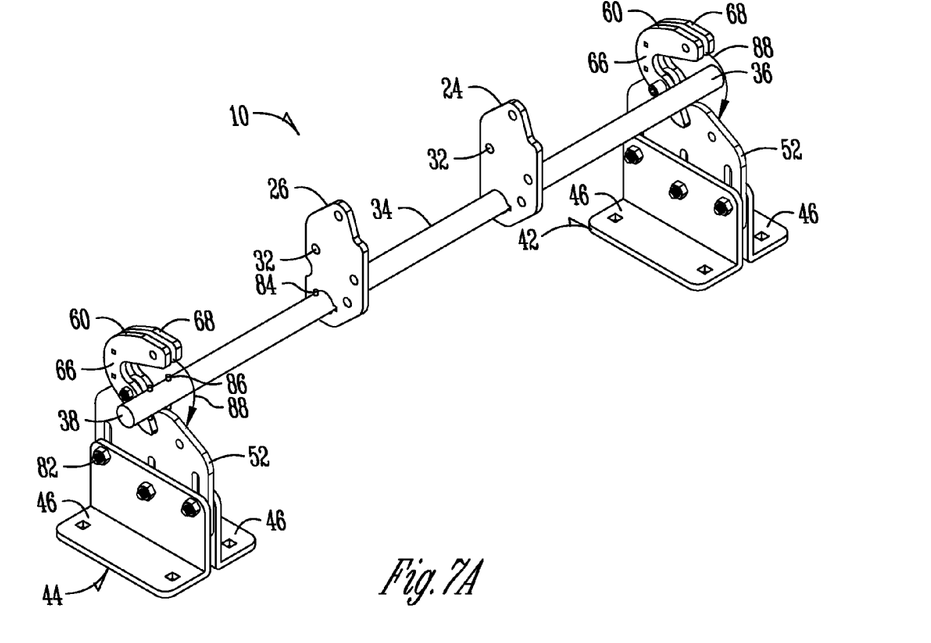
FIGS. 7A and 7B are perspective views of the restraining device showing the connecting rod before and after restraint.
Figure 7B:
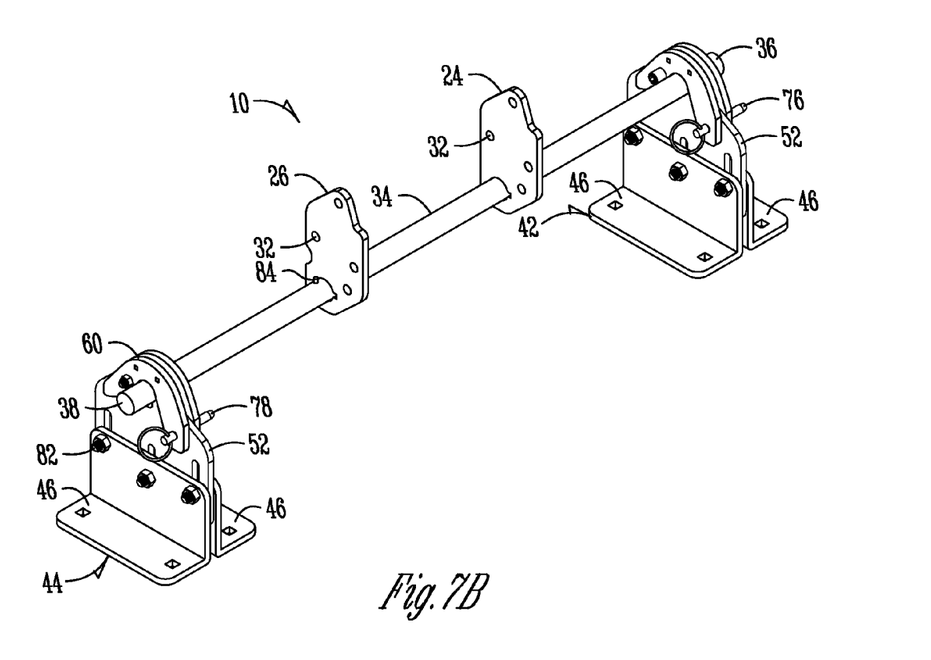

FIGS. 7A and 7B show the motorcycle restraining device 10 of the present invention not connected to a motorcycle 12, but in a restrained position. FIG. 7A shows the connecting rod 34 inserted through the first and second bike brackets 24, 26 in the manner shown in FIGS. 6A through 6C, with the brackets 24, 26 held in place by the bracket protrusions 84. The rod extensions 36, 38, which extend beyond the width of the motorcycle 12, have approached the first and second receiving members 42, 44 and are just engaging the swing latch 60 of the receiving members. As stated, the connecting rods 34 will engage the cam portion 62 of the swing latches 60, which cause the swing latches 60 to close in the direction of the arrows 88 to the position shown in FIG. 7B. Therefore, the swing latches 60 will surround the connecting rod 34 in the recess 58 of the tower slide 52 in the recess 72 of the swing latch 60.

Once the swing latches 60 are closed about the connecting rod 34, first and second locking members 76, 78 are inserted through the swing latches 60 and tower slides 52 to hold the connecting rod 34 in place. In addition, as the connecting rod 34 includes swing latch protrusions 86 that are spaced to be positioned on opposite sides of the swing latch 60, the swing latch protrusions 86 will further aid in preventing the connecting rod 34 from being able to slide in a generally horizontal direction. As the first and second bike brackets 24, 26 are connected to a frame or solid member of the motorcycle 12, no additional means of restraint will be required with the use of the motorcycle restraining device 10 of the present invention. Therefore, no additional stress will be placed on the motorcycle 12 or motorcycle shocks. This may extend the life of the motorcycle 12 and also increase the comfort and use of the motorcycle 12. In addition, as the base brackets 46 of the receiving members 42, 44 are attachably secured to a trailer, pickup bed, or other transport means, the motorcycle restraining device 10 may be used with virtually any device, vehicle, or method of transporting a motorcycle. In addition, as mentioned above, the tower slides 52 are height adjustable to match the height of virtually any make and model of motorcycle.

Figure 8:
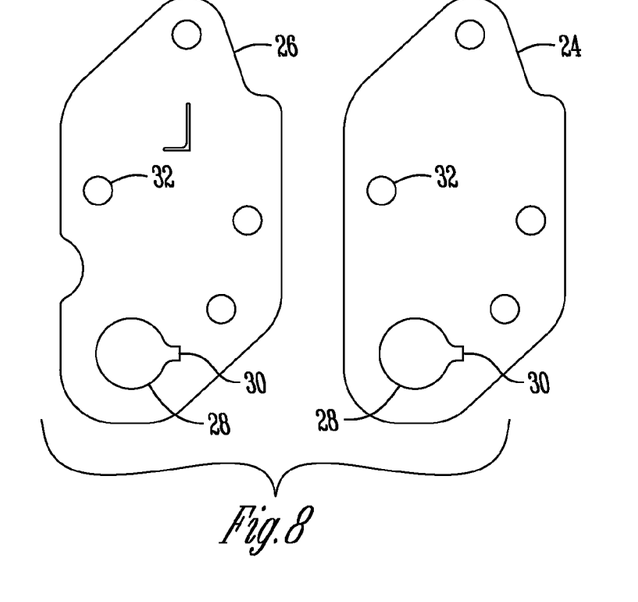
FIG. 8 is an example of a first and second bike bracket for a particular model of motorcycle.
Figure 9:
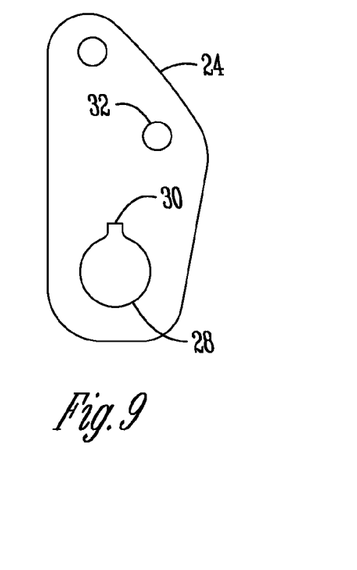
FIG. 9 is an example of a bike bracket for another model of motorcycle.
Figure 10:
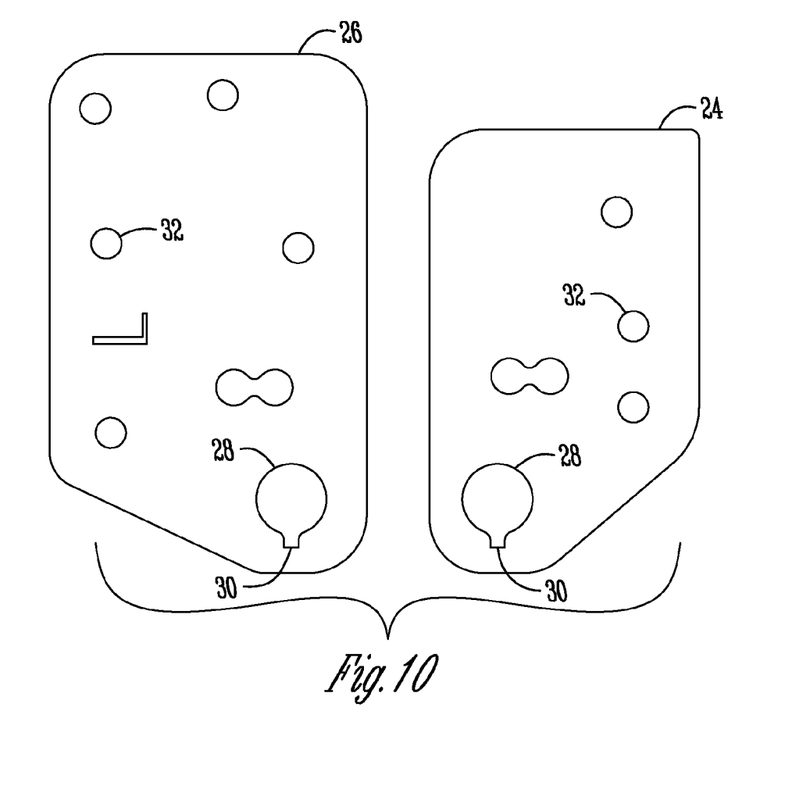
FIG. 10 is an example of first and second bike brackets for use with another specific model of motorcycle.

The only aspect or component of the motorcycle restraining device 10 which will be determined by the make and model of the motorcycle 12 will be the first and second bike brackets 24, 26. FIGS. 8-10 show a few examples of the brackets 24, 26 that are designed for different models of motorcycles. FIG. 8 shows an example of bike brackets that require distinct first and second bike brackets 24, 26. As shown, the brackets include slight variations for the particular make and model of motorcycle to account for components of the motorcycle on the right and left side of said motorcycle. However, FIG. 9 shows a bracket 24 that may be identical for both the right and left sides of the motorcycle. Therefore, it does not matter which side is used for the right and left sides of the motorcycle. FIG. 10 shows another variation of first and second bike brackets 24, 26. The brackets shown in FIG. 10 include variations in number of holes 32, as well as in the overall size and shape of the brackets. However, it should be noted that in all examples in FIGS. 8-10, some common aspects of the bike brackets are included in any make and model. For example, all bike brackets include an aperture 28 with a notch 30 for the passage of protrusions 84, 86 of the connecting rod 34. Also included are holes 32 that are used to attach the bike brackets to the motorcycle 12. The change in size and shape of the brackets is merely to accommodate the different clearance and existing bolt patterns found on different makes and models of motorcycles. It should also be noted that the brackets are generally made of a rigid material, such as sheet metal or steel. Therefore, it will not take much work to cut or fabricate the specific bracket for the particularly bike and therefore all shapes, sizes, and hole orientations are contemplated to be a part of the present invention.

Other alternative variations obvious to those in the field of the art are considered to be included in this invention. For example, as noted above, the size, shape, and material use for the bike brackets may be varied according to the specific make and model of the motorcycle to be transported. In addition, all means and methods of securing the members may be varied as well. However, it should be noted that as the brackets are the only component of the motorcycle restraining device 10 that needs to be determined based on the particular make and model of the motorcycle, the motorcycle restraining device 10 of the present invention may be used with generally any make and model of motorcycle. In addition, the restraining device 10 may be used with any type of transport of motorcycle as well. For example, the restraining device 10 may be used with trailers, both closed and open, pickups, recreational vehicles, or any other manner used to transport a motorcycle. The base brackets 46 of the restraining device 10 may be connected and disconnected to any transfer vehicle or trailer in a quick and timely fashion. In addition, the tower slides may be height adjustable to accommodate any make or model of motorcycle as well. Therefore, the restraining device may be used generally universally without the use of any straps, tie downs, or other brackets or clamps that use a downward force to restrain the motorcycle. It should be appreciated that the description is merely an example of embodiment of the present invention and the limitations of the invention are not limited to the application.

What is claimed is:

1. A motorcycle restraining device for securing a motorcycle to a trailer, comprising:
    a first and second bike bracket attached to opposite sides of the motorcycle, the first and second bike brackets extending generally downwardly from the motorcycle;
    a connecting, rod inserted through the first and second bike brackets, the connecting rod including a plurality of protrusions extending therefrom and configured to prevent the connecting rod from moving along its axis during transport of the motorcycle; and
    an anchor attached to the trailer, the anchor including first and second receiving members for receiving and securing the connecting rod.

2. The device of claim 1 wherein the first and second bike brackets include an aperture for receiving the connecting rod.

3. The device of claim 1 wherein each of the first and second receiving members of the anchor comprise at least one base bracket, a tower slide connected to the at least one base bracket, and a swing latch operatively connected to the tower slide.

4. The device of claim 3 wherein the connecting rod is received and secured between the swing latch and tower slide of the first and second receiving members of the anchor.

5. The device of claim 4 wherein the connecting rod is a cylinder.

6. The device of claim 5 wherein the plurality of protrusions are positioned such that they are offset on opposite sides of the first bike bracket and first receiving member of the anchor.

7. The device of claim 6 further comprising a locking member for locking the rod securely to the anchor.

8. The device of claim 7 wherein the swing latch comprises a cam portion and an arcuate portion.

9. The device of claim 8 wherein the at least one base bracket of the first and second receiving members of the anchor is connected to the trailer.

10. A motorcycle restraining device for securing a motorcycle to a trailer for hauling or storing the motorcycle, comprising:
    a first and second bike bracket attached to opposite sides of the motorcycle, the first and second bike brackets extending generally downwardly from the motorcycle;

a connecting rod inserted through the first and second bike brackets, the connecting rod extending beyond the first and second bike brackets;

a first receiving member for receiving a portion of the connecting rod extending away from the first bike bracket, the first receiving member comprising at least one base bracket, a tower slide adjustably connected to the at least one base bracket, and a swing latch rotatably connected to the tower slide adapted to surround the connecting rod; and a second receiving member for receiving a portion of the connecting rod extending away from the second bike bracket, the second receiving member comprising at least one base bracket, a tower slide adjustably connected to the at least one base bracket, and a swing latch rotatably connected to the tower slide adapted to surround the connecting rod wherein the first and second bike brackets are attached to foot pegs on opposite sides of the motorcycle.

11. The device of claim 10 wherein the first receiving member and the second receiving member each include a second base bracket.

12. The device of claim 10 wherein the swing latch of the first receiving member and the second receiving member comprises a cam portion, an arcuate portion, and a recess therebetween.

13. The device of claim 12 wherein the arcuate portion of the swing latch surrounds the connecting rod.

14. The device of claim 13 wherein the arcuate portion of the swing latch is secured to the tower slide to secure the connecting rod to the first and second receiving members.

15. The device of claim 14 wherein the swing latch includes a first and second member connected by a brace.

16. A motorcycle restraining device for securing a motorcycle to a trailer for hauling or storing the motorcycle, comprising:

a first bike bracket connected to a preexisting bolt site of the right side of the motorcycle, the first bike bracket extending forwardly and downwardly;

a second bike bracket connected to a preexisting bolt site of the left side of the motorcycle, the second bike bracket extending forwardly and downwardly;

a connecting rod extending through and beyond the first and second bike brackets, the connecting rod including protrusions for securing the rod in place relative to the bike brackets;

a first receiving member for receiving a portion of the connecting rod extending away from the first bike bracket, the first receiving member comprising at least one base bracket, a tower slide adjustably connected to the at least one base bracket, and a swing latch rotatably connected to the tower slide adapted to surround the connecting rod; and a second receiving member for receiving a portion of the connecting rod extending away from the second bike bracket, the second receiving member comprising at least one base bracket, a tower slide adjustably connected to the at least one base bracket, and a swing latch rotatably connected to the tower slide adapted to surround the connecting rod.

17. The device of claim 16 further comprising a first and second locking member configured to lock an arcuate portion of the swing latch of the first and second receiving member to the tower slide.

18. The device of claim 16 wherein the first and second receiving members further include a securing member configured to adjustably secure the height of the tower slide.

19. The device of claim 16 wherein the tower slide includes a recess configured to receive and hold the rod in place.

\* \* \* \* \*

UNITED STATES PATENT AND TRADEMARK OFFICE
CERTIFICATE OF CORRECTION

PATENT NO. : 8,348,561 B1
APPLICATION NO. : 13/198109
DATED : January 8, 2013
INVENTOR(S) : Joey Bauer, Sr.

It is certified that error appears in the above-identified patent and that said Letters Patent is hereby corrected as shown below:

Column 9, claim 10, line 1:
DELETE after second "hike"
ADD after second --bike--

Signed and Sealed this
Fifth Day of March, 2013

Teresa Stanek Rea
*Acting Director of the United States Patent and Trademark Office*